United States Patent [19]

Neary

[11] 4,424,805

[45] Jan. 10, 1984

[54] SOLAR ENERGY SYSTEM AND METHOD OF USE

[76] Inventor: Michael P. Neary, Rte. 7, Box 124N, Santa Fe, N. Mex. 87501

[21] Appl. No.: 136,496

[22] Filed: Apr. 3, 1980

Related U.S. Application Data

[63] Continuation-in-part of Ser. No. 894,826, Apr. 10, 1978, abandoned, and Ser. No. 911,056, May 30, 1978, abandoned.

[51] Int. Cl.$^3$ ............................................. F24J 3/02
[52] U.S. Cl. ................................. 126/452; 126/417; 126/432; 126/435; 126/436; 204/162 R; 204/158 R
[58] Field of Search ....................... 204/158 R, 162 R; 126/432, 441, 417, 435, 436, 452, 900, 901, 400; 165/104 S, 104.12; 432/1

[56] References Cited

U.S. PATENT DOCUMENTS 4,004,572 1/1977 Nathan ................................ 126/452
4,117,882 10/1978 Shurcliff ............................. 126/417

OTHER PUBLICATIONS

Laird, "Energy Storage Via Photochemical Reactions", Chemistry & Industry, Mar. 18, 1978, pp. 186–192.

*Primary Examiner*—Howard S. Williams

[57] ABSTRACT

This invention relates to a solar energy system wherein chemical A is converted into chemical B in the presence of a photo-sensitizer with the absorption of considerable heat, which heat can be redelivered at will by placing chemical B in contact with a catalyst. The catalyst is stable at high temperatures permitting operation through the phase change from liquid to vapor with consequent use of chemical B for performing work in engines, heat pumps and the like.

22 Claims, 6 Drawing Figures

SOLAR ENERGY SYSTEM AND METHOD OF USE

This is a continuation-in-part of my co-pending application, Ser. No. 894,826 filed Apr. 10, 1978, now abandoned, and also a continuation-in-part of my co-pending application Ser. No. 911,056 filed May 30, 1978, now abandoned.

This invention relates to a novel solar energy system.

The world's need for efficient utilization of as yet unused energy sources grows daily. Virtually all of the energy sources presently being used are either non-renewable (i.e., fossil fuels) or present substantial risk to the environment (i.e., nuclear fuels). Other energy sources not yet in substantial use include wind and solar energy. Solar energy is distinct from all others in that it is limitless and in constant supply.

Until recently, the feature that distinguished fossil and nuclear energy from solar energy was the physical and chemical stability of fossil and nuclear fuels and the absence of a solar fuel. It is noted that the term "fuel" means the stored form of energy and, as such, provides the physical-chemical means of storage and controlled utilization.

A good fuel of any type should be inexpensive, easily handled, non-toxic, and high in energy content. An ideal fuel, in addition to the above, would be recyclable.

The prior art discloses many solar energy systems based on water or other aqueous fuel media, and also some eutectic salt systems. All of these require heating by the sun to raise the fuel above ambient temperatures and it is necessary to maintain such raised temperatures by costly and inefficient insulating means until the energy is finally used as in residence heating or the like.

U.S. Pat. Nos. 4,004,571, 4,004,572 and 4,004,573, all issued Jan. 25, 1977, and assigned to Battelle Corp., disclose solar energy systems using mixtures of water and certain isomerizable materials, but acknowledge difficulties in operating, including the necessity to actually supply heat to induce reverse isomerization, conflicting reactions in the system as the temperature rises, thus limiting conversion efficiency and storability, and the necessity for separate storage of products, as well as other problems.

A typical prior art disclosure is found in Solar Energy, Volume 19, pages 503 to 508, Pergaman Press (printed in Great Britain) entitled "The Use of Functionalized Polymers as Photo-sensitizers in an Energy Storage Reaction" by Hautala et al. This publication, like others in the literature, fails to disclose a complete system for solar energy storage and does not disclose sufficient details for an operable system for this purpose.

The principal object of the present invention is a new and improved solar energy system in which insulation is not required.

A further object is a solar energy system characterized by efficiency of a much greater order of magnitude than possible heretofore.

A further object is such a system in which the catalyst is characterized by high heat stability to permit use of higher temperatures of the order of magnitude of 140° C. or more without decomposition, permitting phase change from liquid to gas in the system, so that work can be developed, as in an engine or heat pump.

Other objectives will be appreciated from the further detailed description of the invention.

BRIEF SUMMARY OF THE INVENTION

This invention relates to a Solar Energy System wherein Chemical A is converted into Chemical B in the presence of a photosensitizer with absorption of considerable heat, which heat can be recovered at will by placing chemical B in contact with a catalyst.

Photo-chemical reactions present the ideal means of creating a new solar energy system, but not all are suitable. A photo-chemical derived fuel of selected properties also could make possible the absence of photo-degradation of either the starting material or the energy rich product, as well as high energy conversion for both energy absorption and emission.

Accordingly, the present invention relates to a solar energy system wherein Chemical A is converted into Chemical B in the presence of a specific selected sensitizer with the absorption of considerable solar energy, which heat can be redelivered at will by placing Chemical B in contact with a particular selected catalyst.

In its preferred form this invention system involves a photoisomerization reaction. Chemical A is selected from chemicals which can be made to isomerize by sunlight to form chemical B as an isomer while absorbing solar heat in substantial quantities. Preferably a particular photosensitizer is present to enhance the isomerization when the light source is the sun.

While many different isomers can be used, I greatly prefer to use the system in which norbornadiene (NBD) is converted into its isomer quadricyclene (Q).

The liquid NBD is exposed to sunlight in the presence of a particular photosensitizer. Any suitable solar collector can be used.

Figure 1:
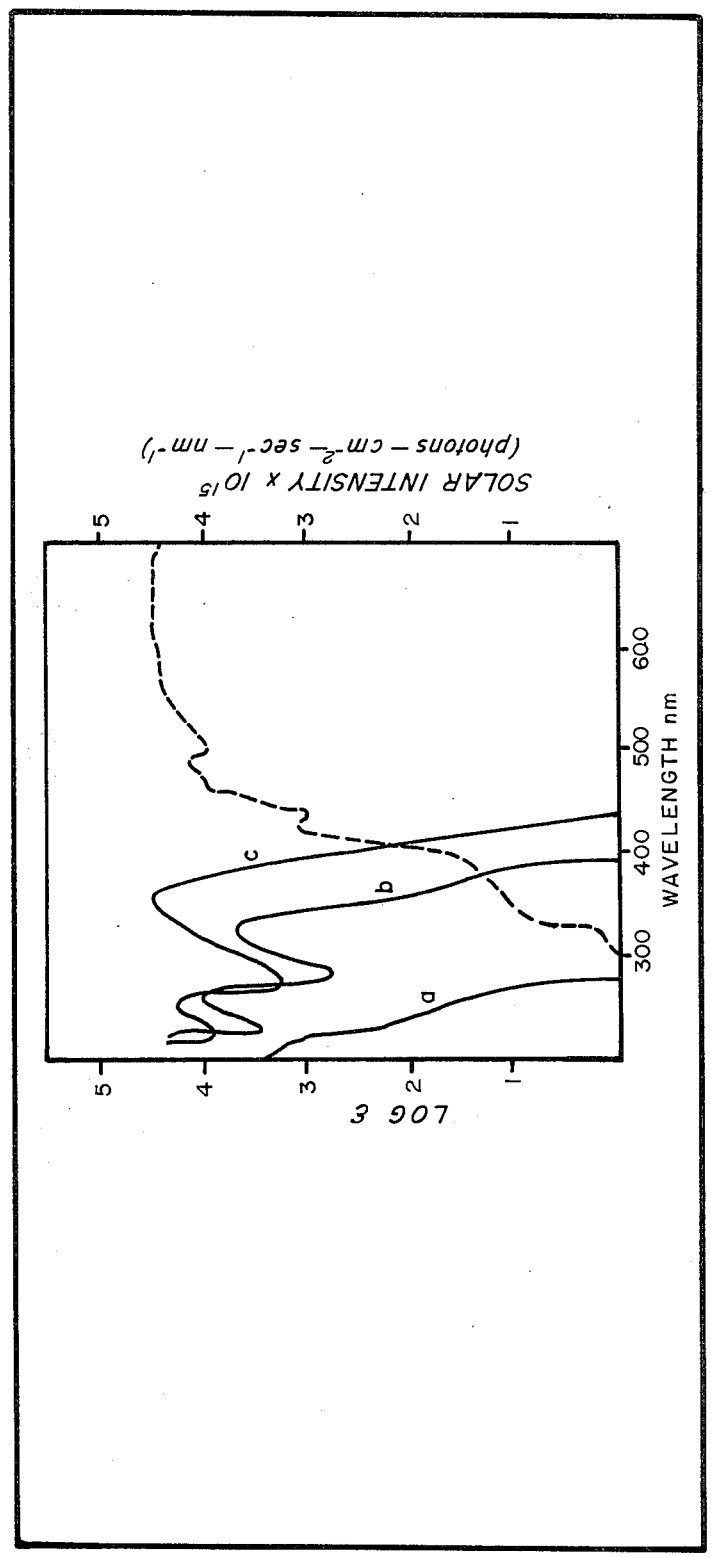
FIG. 1 is a graph showing overlap of the Electronic Absorption Spectra (in non-polar solvents) NBD (a), o-Benzyloxybenzaldehyde (b), and 4-(N,N-Dimethylamino)-benzophenone (c) with the Solar Radiance Spectrum (---): Midday, Midsummer at Latitude 40° N.

While many photosensitizers may be used, it is greatly preferred that the sensitizers' electronic absorption spectrum shall overlap both the electronic absorption spectrum of NBD and the sun's emission spectrum. When this is the case, the photosensitizer absorbs the sun's radiation and transfers the absorbed energy to the NBD which immediately isomerizes to the liquid Q. Thus the benefits of the photosensitizer can be appreciated. A preferred photosensitizer is 4-(N,N-dimethylamino) benzophenone. FIG. 1 shows spectral data for these sensitizers and the sun's emission.

It is greatly preferred to use the NBD neat, that is, without water or other diluent.

It is not necessary to insulate Q which gives up its energy in the presence of a catalyst as desired. One preferred catalyst for this purpose is a cobalt (II) porphyrin.

Substantial additions are obtained by immobilizing both the photosensitizers and the catalysts in their respective zones. One preferred way of accomplishing this is by chemical attachment of the photosensitizers or the catalysts to particular separate insoluble silanized matrices, such as controlled pore glass beads, alumina, etc. Thus beads or chips of the silanized glass photosensitizer or the silanized catalyst can then be disposed and retained in the photosensitizer zone and in the catalyst-heating regenerating zone respectively.

Figure 2:
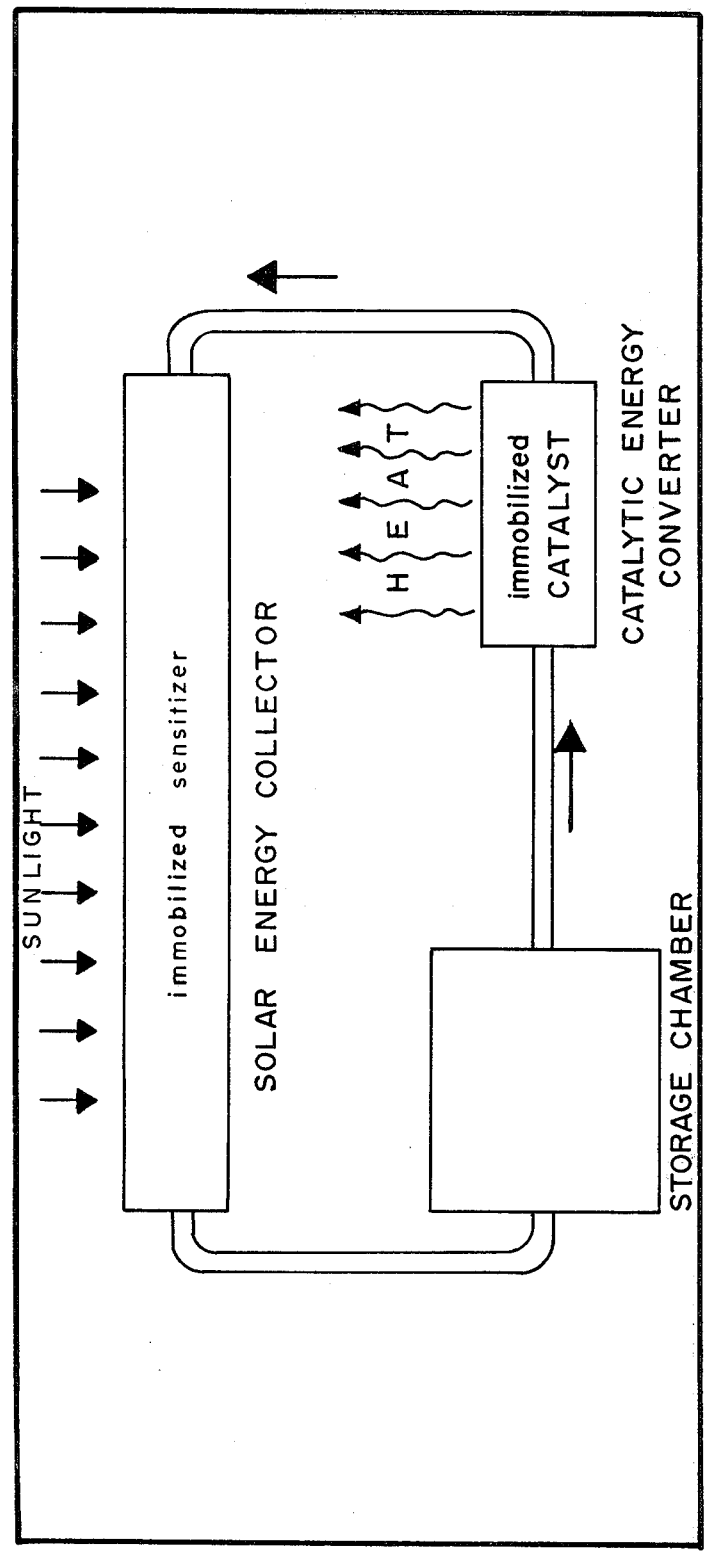
FIG. 2 is a schematic diagram of a potential solar energy system.

Referring to FIG. 2, the Solar Energy Collector was charged with approximately 400 liters of NBD, and several hundred grams of immobilized photosensitizer on silanized glass beads. Sunlight was admitted to the collector for a period of time, upon which circulation of the liquid was started counterclockwise in the conduits as shown by the arrows and the resulting liquid containing the isomer Q which had been formed was delivered to the storage chamber. When heat was needed, the liquid Q was released from storage through the conduit through the Catalytic Energy Converter which was charged with an immobilized catalyst or silanized glass beads, namely, controlled pore glass beads, containing a cobalt (II) prophyrin in the amount of several hundred grams. Upon contacting the catalyst, the chemical Q was reisomerized to NBD and heat was given off in the order of magnitude of 260 calories per gram of Q. The heat was permitted to pass by heat transfer from the converter to convenient use. The remaining liquid containing NBD thus regenerated passed through the exit conduit along the counterclockwise arrows and returned to the Solar Energy Collector. At this point the cycle was complete.

This type of photoisomerization of NBD to Q possesses a number of attractive features as listed below:

1. NBD is readily available and comparatively inexpensive.
2. Q has a very high energy storage capacity, approximately 3.5 million Joules per gallon or 830,000 calories per gallon (260 calories per gram); three to four times greater than water-based systems.
3. Both NBD and Q are liquids. Q is chemically stable at ambient temperatures but with an appropriate catalyst can be readily reconverted to NBD with release of the stored energy heat.
4. Conditions exist for which both photochemical formulation of Q and catalytic reversion of NBD can be made virtually quantitative.
5. Sunlight can effect the photochemical conversion (isomerization) and NBD to Q with high quantum efficiency using special photosensitizers.
6. Sunlight is stored as chemical energy rather than thermal energy, thus the need for extensive insulation of the storage medium is eliminated.
7. Solar energy may be stored indefinitely, since reversion of Q to NBD is negligibly slow at room temperature in the absence of a catalyst.

A practical working device based on the NBD-Q system requires a readily available, high efficiency photosensitizer and catalyst as well as knowledge of the conditions that will allow long-term recyclability of the system. Furthermore, the photosensitizer and catalyst are desirably physically confined to their respective chambers in a working device.

The invention may be more readily understood by referring to the various figures of the drawings.

The remainder of the technical description will deal with each component of the system in detail in the following order: (1) the chemical reaction with physical and chemical properties of the reactants listed, (2) the chemical nature of the photosensitizer and methods for immobilization, (3) the chemical nature of the catalyst and methods for immobilization, and (4) the physical design of the system and the solar collector.

The Chemical System

The photoisomerization of NBD to Q is schematically shown in equation 1:

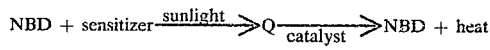

The NBD may be used neat or with a secondary non-aqueous solvent such as cyclohexane; but when used neat, the stored, energy per unit volume is maximized.

Because there is no overlap in the electronic absorption spectrum of NBD and the emission spectrum of the sun, it is not possible to convert NBD to Q directly by sunlight. FIG. 1 illustrates this fact. Ideally the photosensitizer's electronic absorption spectrum should overlap both the electronic absorption spectrum of NBD and the sun's emission spectrum. When this is the case, the photosensitizer absorbs the sun's radiation and transfers the absorbed energy to NBD, which immediately isomerizes to Q. Thus, the necessity of a particular type of photosensitizer is clear.

The stability of Q, the solar fuel, is a desirable feature of the system because it makes long-term storage possible. However, this feature imposes on the system the need for a means of controlled release of the stored energy and reversion to NBD. The catalyst shown in equation 1 performs this function.

The physical characteristics of NBD are listed below:
1. IUPAC name—Bicyclo[ 2,2,1]-hepta-2,5-diene
2. Molecular weight—92.13
3. Melting point—19.9° C.
4. Boiling point—89.5° C.
5. Density at 20° C.—0.909 g/cm$^3$
6. Refractive index at 25° C. with the sodium D line=1.4684

The physical need to confine the catalyst for the heat releasing reaction to the "catalytic" chamber (FIG. 2) can be met by chemical attachment of the catalyst to an insoluble silanized matrix. Similar confinement of the photosensitizer to the "irradiation" chamber is desirable for a number of simple reasons. The absolute quantity of photosensitizer needed can thus be reduced by several orders of magnitude. Periodic replacement of the photochemical fluid does not necessitate replacement of the photosensitizer and vice versa. Undesirable interactions with the catalyst (in the catalytic chamber) are also avoided. For example, these might involve destruction of the photosensitizer by the catalyst or poisoning of the catalyst by the photosensitizer. A photosensitizer chemically bound to a silanized matrix solves the problem. At the outset of work, little information was available regarding the complications and problems that might be encountered in heterogeneous photosensitization. Low quantum efficiencies were anticipated relative to homogeneous systems. Among the effects which could decrease the efficiency are excessive light scattering and inefficient liquid diffusion to photosensitizer sites within the substrate. It turns out that certain photosensitizers exhibit a more favorable performance when bound to a surface due to perturbations in the photophysical or photochemical behavior of the chromophore. Finally, any selective adsorptive affinity of the solid matrix toward NBD (relative to that toward Q or any co-solvent) would allow high local concentrations of NBD to be maintained. Since the majority of undesired side reactions results from interaction of the photosensitizer with Q, the impact of this annoying difficulty can be significantly reduced by immobilization of the photosensitizer.

Immobilization of the photosensitizer and catalyst is employed so that they can be kept separate and isolated to a specific location within the system. The purpose of restricting the photosensitizer and catalyst to separate locations is to eliminate mixing during the operation of the system and thus the formation of undesirable photoadducts as well as catalysis of Q as it is formed in the collector.

Any practical immobilization scheme that would satisfy the above intention must result in the photosensitizer and catalyst being chemically bound to a mechanically stable substrate. The substrate must also have a large surface area, exhibit chemical activity at its surface with respect to the immobilization agent but be chemically inert with respect to the photochemical and/or catalytic reaction occurring at its surface. Mechanical stability of the substrate is the characteristic that is rarely found among common substrates such as polymer or resin beads and fibers.

Siliceous materials such as silica, silica gel, glass, and fiber glass, satisfy all of the requirements for a suitable substrate. Other suitable substrates include alumina mole sieves, semi-permeable membranes and certain metals and metal oxides. It is generally true that, with all of the substrates mentioned, the surface area per unit volume or mass can be controlled during manufacture. It is also generally true that these substrates are chemically active with respect to the immobilization agent but chemically inert with respect to either/both the photochemical and catalytic reactions. The mechanical stability of these compounds is known to be excellent. As an example of such a substrate to which the immobilization process has been applied we cite Corning Glass Works Controlled Pore Glass Beads (40/80 mesh, 80 meters$^2$/gm surface area, 550 Å pore diameter (average)). The immobilization chemistry presented below can be applied to all of the substrates mentioned however, so that this discussion can remain brief; only the controlled pore glass beads will be mentioned or taken as an example.

Immobilization (chemical binding) of organic molecules such as the photosensitizer and catalyst on inorganic substrates, such as those mentioned, depends on a reagent which, under mild conditions, can react with the substrate surface and an organic or organometallic compound (such as a photosensitizer and catalyst) to form chemical bonds. Such a reagent or family of reagents are the silanes which are organo silicon monomers which characteristically possess two or more different types of chemical functionality. Due to the unique ambifunctionality of silane, bonding of dissimilar materials is often possible. Such bonding is the result of the silane molecule forming a chemical bridge across the organic-inorganic interface.

The general formula for silane is $$R\text{-}SiX_3$$

where
R = an organic functional group covalently bound to the silicon atom in a terminally and hydrolytically-stable manner, and
X = an hydrolyzable group bound to the silicon atom.

With many silanes, though not all, the organofunctional group, R, is separated from the silicon atom by a propyl chain and X is an alkoxy group such as methoxy. Thus the formula may be written $$R(CH_2)_3Si(OCH_3)_3$$

The mechanism by which silanes interact chemically with siliceous material depends on the presences of inorganic functional sites on the surface, such as silanols (SiOH) and silicon oxides (SiO$_x$), as well as water on the surface. The proposed mechanism includes several steps beginning with rapid hydrolysis of the silane alkoxy groups forming the corresponding silanol and (usually) an organic acid or alcohol. The final steps in the mechanism involves bonding the silanol moiety with either a surface oxide or alcohol moiety, thus leaving the organic functional group, R, extended away from the surface. By proper selection of a silane and therefore R group, many other organic compounds can be covalently bound to the R group in situ.

Silanes may be bound to certain metal and/or metal surfaces; however, the chemical mechanisms are not well understood. The strength of the bond formed by silanes with metal or metaloxide surfaces depends on the effective "acidity or alkalinity" of the surface (i.e., isoelectric point). Certain silanes with an amino organic functional group in the gamma position with respect to the silicon atom bond easily to metal and/or metal oxide surfaces. It is thought that the gamma amino organic functional group forms a bond with metal atoms by complexation, coordination or chelation. Thus, not only is the silanol moiety of the silane bound to the metal and/or metal oxide surface but an amino-metal bond is formed as well. Iron and copper are two metals with so-called "alkaline" surfaces that are easily silanized using gamma amino functionalized silanes.

The chemical reaction occurring on the organic side of the surface bound silane results in covalent bonding of the photosensitizer and/or catalyst molecules. Thus the selection of the proper type of silane depends on the reactivity of the silane organic moiety and the photosensitizer and/or catalyst.

The following list of silanes, though not exhaustive, shows representatives of those with organic functional groups useful to chemically bind photosensitizer and catalyst molecules.

(1) modified amino functional silane—includes secondary amines and a terminal ester group.

(2) amino functional silane—includes secondary amines and terminal primary amino group (3) mercapto functional silane—includes a terminal mercapto group.

(4) vinyl functional silane—includes a terminal vinyl group.

(5) chloroalkyl functional silane—includes a terminal chloro group.

Virtually all of the useful photosensitizers and their derivatives that exist can be immobilized using organo functionalized silanes (one of those listed or one not listed above). The photosensitizers of interest are those that can transfer energy from one of their excited states to the excited state manifold of NBD. A few photosensitizers are listed below:

(1) phenyl ketones and derivatives
  (a) acetophenone
  (b) 4-(N,N-dimethyl(ammo)benzophenone
(2) phenyl aldehydes and derivatives
  (a) o-benzyloxybenzaldehyde (3) heterocycles and derivatives
  (a) diphenyloxazol
(4) quinones and derivatives
  (a) benzoquinone
  (b) 2,3-dialkylammoquinone
(5) dyes and derivatives
  (a) indigo
  (b) thioindigo
  (c) cyanine
  (d) stilbene
(6) poly cyclic aromatics and derivatives
  (a) anthracene The chemical reactions employed to chemically bind any of the photosensitizers listed explicitly or implicitly above to a particular silane organic functionality are too numerous to describe here. However, one example will be presented.

Fifty grams of controlled pore glass beads 40/80 mesh, 80 meters/gm surface and 550 Å average pore size was treated with a refluxing solution of 5% (v/v) Dow Corning Z—6020 silane in toluene for one hour. The efficiency of the silanization process was checked as follows: 10 ml of 0.1 M $CaCl_2$ was mixed with 3 grams of the silanized controlled pore glass beads; and a deep blue color on the surface of the bead was observed indicating the formation of Cu(11)-ethylenediamine complex thus verifying the nature of the surface of the glass beads. Acetophenone, a photosensitizer, was chemically bound to the terminal amino functionality of the silane used by reacting p-acetyl benzaldehyde in the solvent, hexamethylphosphoric trianine by forming a suspension of 20 gms of the silanized glass beads with the solvent-reactant mixture. After an hour of stirring the solution was filtered and the bead washed with alcohol and dried. The resulting acetophenone functionalized—silane—glass bead was verified spectroscopically.

Catalyst

A good catalyst exhibits high catalytic activity, high specificity, and low cost for the conversion of Q to NBD. In general, catalysts depend on active metals, and to date, the best have been rhodium (I) and nickel complexes and cobalt (II) porphyrins. A practical drawback to the rhodium (I) complexes as catalysts is the high cost of the metals. Certain nickel complexes show high catalytic activity such as triphenylcyclopenyl nickel complexes $[(C_6H_5)_3 C_3 Ni(CO)X]_2$ where X=Cl or Br. The products of these complexes with alkylmagnesium halides in tetrahydrofuran which might be the alkyls $(C_6H_5)_3 C_3 Ni—(OC_4H_3)_2R$ where $R=CH_3$, $C_2H_5$, $(CH_3)_3 CH$, $(CH_3)_3$, and $C_6H_5$ also exhibit good catalytic activity.

The best observed catalysts are the cobalt (II) prophyrins, although elemental iodine and the trigonal prismatic complex $[CF_2)_2 C_2S_2]_3 Mo$ also show catalytic activity.

All of the catalysts useful for isomerization of Q can be bound to a silanized surface. Though the list of catalysts given below is not exhaustive, those mentioned are representative.

(1) metal complexes, chelates and organometallic complexes
  (a) Co(2) porphyrins
  (b) Cu(2) and Cu(1)
  (c) Nickel
  (d) Rhodium
  (e) Platinum
  (f) Alumina
  (g) Palladium Immobilization of catalysts of the type mentioned above follows similar chemical pathways as described for immobilizing acetophone above.

In cases where "active surfaces" can act as a catalyst for isomerization of Q, immobilization is not necessary. However, so that a maximum surface area of active surface is made available to Q a vapor or otherwise deposited coating can be applied to controlled pore glass beads. Items (e), (f) and (g) in the catalyst table are a few candidates for this procedure.

In a preferred embodiment of the invention we find it highly desirable to include in the system at any appropriate point, any suitable separation means for NBD from Q; that is, any chemical or physical method which will increase the concentration of Q during or after exposure to the sun, in the presence or absence of the photosensitizer, or alternatively, will increase the concentration of NBD during or after the generation of heat by exposure of the NBD to the catalyst. While any suitable separation means can be used for this purpose, we have found it possible to use such means as molecular sieves, semi-permeable membranes, capillary devices, chromatographic devices, and the like.

The effects of this preferred concentration of Q or NBD enhances the process of increasing the efficiency thereof and reducing the number of times per unit for passage of the NBD plus Q mixture over the photosensitizer and/or the catalyst.

As mentioned above, the separating device can be inserted anywhere in the system as, for instance, in the photosensitizer zone, in the catalyst zone, or anywhere in between these zones. An extremely simple device, less preferred, such as a filter, can be used to enhance separation by preventing photosensitizer particles or catalyst particles from leaving their respective zones in the liquid stream.

The use of a separating device is described in the following, with respect to the semi-permeable membrane type depicted in FIG. 6:

A semi-permeable membrane may be thought of as a kind of sieve for molecules; and as such provides a barrier through which different molecules pass at different rates. The difference in the rates at which molecules pass through the membrane depends on the difference in chemical potential across the membrane.

Semi-permeable membranes are often made from materials that have chemically active sites, a condition that can cause large (and therefore useful) differences in chemical potential across the membrane by either selective adsorption or chemical reaction. Thus for certain molecules that have little or no difference in chemical potential between or among them when mixed, substantial differences in chemical potential can be observed when a semi-permeable membrane separates the mixture and a pure component of the mixture; and therefore, differences in the rates of transport across the membrane. Thus the chemical nature of the semi-permeable membrane as is or chemically modified can cause separation of different chemical species.

The chemically active sites on semi-permeable membranes can also be chemically altered to include other chemical functionalities that can either increase the difference in chemical potential between or among different molecules, or absorb electromagnetic radiation (light) on some desired wavelength range or both. In fact, if the absorbed light can cause a chemical change in one or more of the molecular species present, such that a large difference in chemical potential exists between the newly formed molecule and its precursor, flow across the membrane can be restricted to the species of interest, thus causing a high concentration of the precursor species on one side of the membrane and a high concentration of the product species on the other side of the membrane or a kind of separation.

Certain semipermeable membranes are formed from materials that exhibit great tensile and shear strength but flexibility. Many are also resistant to solvent or chemical attack that results in the degradation of the physical characteristics of the membrane.

Thus membranes (semi-permeable) can be selected whose chemical and physical properties complement the physical and chemical environment of the solar system described herein. In general, the use of a semi-permeable membrane would be restricted to the solar collector and therefore a photosensitizer molecule must be either physically or chemically attached to the membrane surface. A method for achieving this end will be presented where a semi-permeable membrane of a polycarbonate is selected for the example and a chemical derivative of acetophenone. However, the immobilization scheme shown in the example is not restricted to the species selected for the example. Note also that the scheme presented in the example results in chemical attachment of acetophenone (a photosensitizer) to the polycarbonate surface (a semi-permeable membrane); however, physical attachment may be employed as an immobilization technique by simply combining a small amount of the photosensitizer with a solvent that can soften (dissolve) the polycarbonate surface and then treating the polycarbonate surface with the mixture. Upon drying or evaporating the solvent off of the membrane surface, the photosensitizer will become entrained in the surface and, once the surface rehardens, fastened tightly. However, the chemical method for immobilizing the photosensitizer on the surface of the semi-permeable membrane is preferred.

The general chemical formula for a polycarbonate in a semi-permeable membrane is

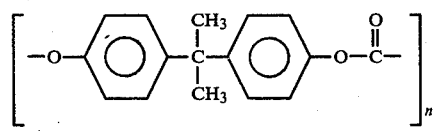

and will be referred to as I. When I is treated with either ammonia gas or an ammonia solution, I is chemically altered, forming, (the two dashes at the ends of the formula and the subscripted n are meant to convey the idea that other identical chemical moieties are connected to form a long chain molecule with repeating chemical moieties).

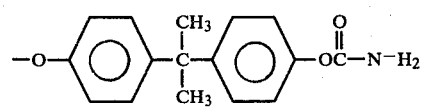

and

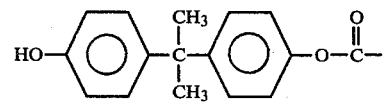

referred to as II and III respectively. When II and/or III are treated with a solution of hexamethylphosphoric triamide and p-acetal benzoylchloride or p-chloromethyl acetophenone, II is converted to

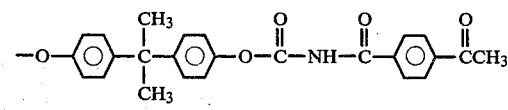

or

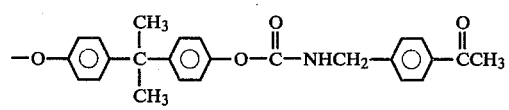

and III is converted to

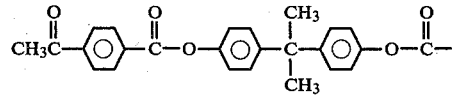

(here the single dash indicates the place at which I starts repeating n times) or

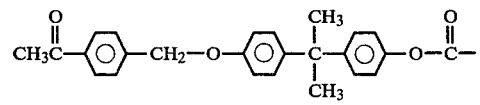

Thus acetophenone, a good photosensitizer, can be chemically attached to a polycarbonate semi-permeable membrane. Other photosensitizers such as 4-(N,N-dimethyl) benzophenone can be chemically attached to polycarbonate semipermeable membranes by a similar chemical scheme. Likewise for other semi-permeable membranes that possess chemically active sites on their surfaces.

Figure 6:
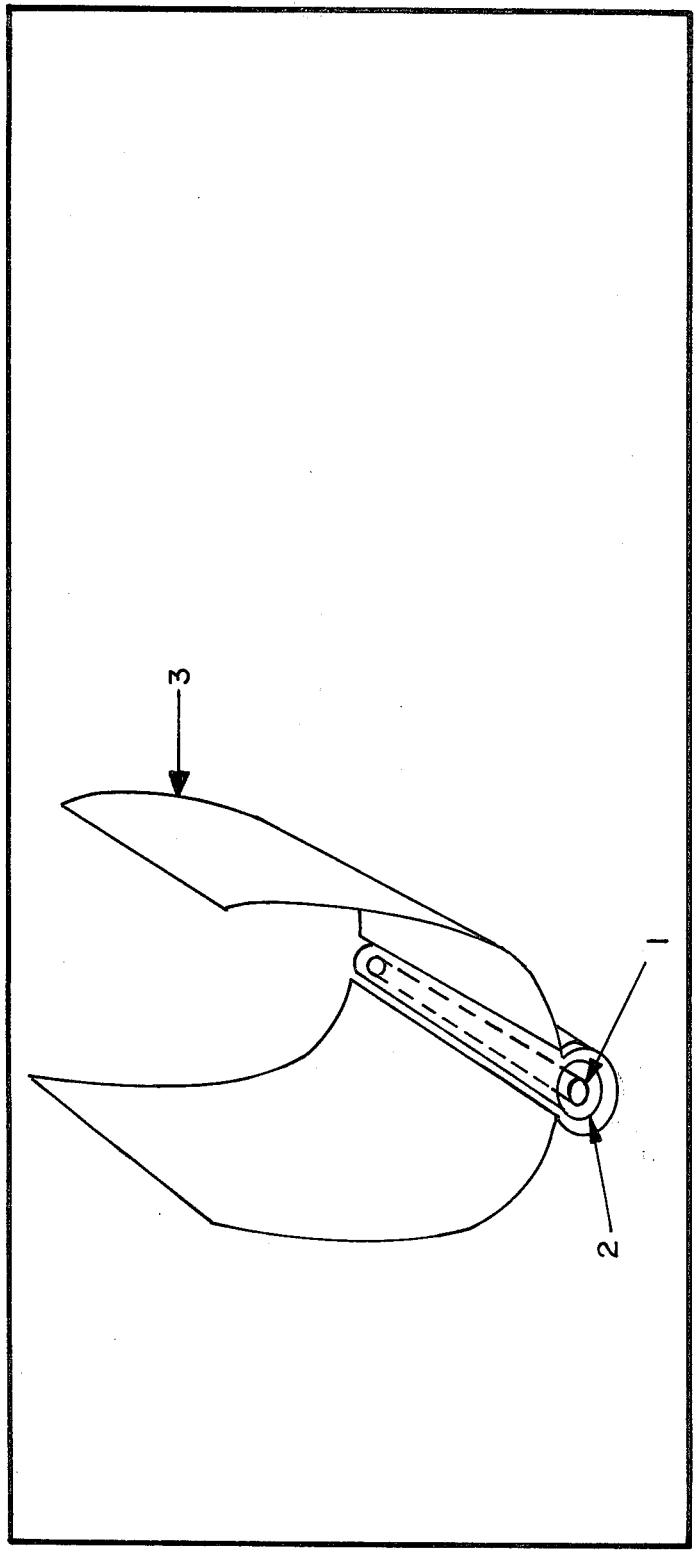
FIG. 6 shows a system containing a semi-permeable membrane.

FIG. 6 shows the physical orientation of the semipermeable membrane (labeled (1)) and a mechanically rigid and transparent tube (labeled (2)) in an annular configuration. Both (1) and (2) are shown in one of the troughs of the compound parabolic concentrator (labeled (3)). Typically NBD would be conducted into either the space between (1) and (2) or the space enclosed by (1). The photosensitizer would be chemically bound to both sides of (1). As Q is formed at either surface of (1), it will migrate away from the surface at which it is formed, leaving vacant a reaction site on the membrane into which another NBD molecule can move to await isomerization to Q. This process is repeated rapidly at many such locations on the membrane surface. The result is to concentrate Q on one side of the membrane. The ends of the tubes shown in FIG. 6, # (1) and # (2) are attached with the rest of the system so that the Q rich fluid is kept separate from the rest of the fluid which can then be recycled through the collector.

Because a chemical reaction, isomerization in this case, occurs at the surface of the semi-permeable membrane, there will be a difference in chemical potential across the membrane and therefore some degree of separation of NBD and Q. Clearly other chemical reactions, such as geometrical and/or valence isomerization as well as others, can be carried out on a semi-permeable membrane surface with the advantages mentioned above.

The need to physically retain the catalyst for the heat-releasing reaction to the catalytic chamber, as seen in FIG. 2, has been mentioned before. Confinement of the photosensitizer to the irradiation chamber reduces the amount of photosensitizer required by several orders of magnitude, facilitates service to the chamber, and eliminates undesirable interaction between catalyst and photosensitizer. Similarly, confinement of the catalyst provides the same advantages. Selection of a catalyst depends initially on the ease with which it can be immobilized.

Solar Collector

The variety of design in solar collectors are so numerous as to warrant only a few general remarks and a brief description of the best.

The most primative of all solar collectors are flat plates which are fixed at some optimum angle (with respect to the earth). The angle usually corresponds to the latitude of the collector's location. This type of collector is not provided with a means of tracking the sun so that the optimum transverse angle can be maintained (such tracking is referred to as "diurnal tracking").

The next step in sophistication is to equip the flat-plate collector with a diurnal tracking system. Even with such an optimized system, light losses due to reflection and scatter are very large (>50%).

By far, the most efficient collector is referred to as a compound parabolic concentrator. This collector's performance is not improved by diurnal tracking, thus making it less expensive than the flat-plate collector with diurnal tracking. Because of the optical properties of the compound parabolic concentrator, only slight losses due to light scatter are encountered, but no reflective losses.

Any of the collectors mentioned could be used for irradiating NBD and to contain the photosensitizer; however, the compound parabolic concentrator is more efficient than any known collector and less expensive than a flat-plate collector equipped with a diurnal tracking system.

A complete discussion of the compound parabolic concentrator is too lengthy to include here; however, such a description can be made available on request. Otherwise, a discussion is available in Argonne National Laboratory's Semiannual Report to NSF, *Solar Energy Concentration*, Report NO. NSF/RANN/SE-AER-75-01065/PR/75/4, February 1975.

It will be appreciated that many modifications may be made in the foregoing concepts without departing from the scope of this invention, including, for instance, various additional sensitizers, catalysts, and photoisomerization systems, equipment configuration and others. Furthermore, the invention is intended to include the following:

1. The application of the specific chemistry described for cyclical solar energy storage and retrieval as heat, 2. The physical arrangement of the various chemical processes, 3. The engineering ideas that couple each of the chemical processes to one another in the order described, as well as any other combinations of them that still lead to solar energy storage and its subsequent conversion to heat for whatever purposes, 4. Any chemical or engineering procedures, ancillary to the main process but necessary for adjusting the overall physical or economic efficiency of the process, such as:

a. Method(s) for on-line or off-line purification of either reactant, product, sensitizer, or catalyst at any stage of use (i.e., before, during, or after installation or operation), b. Use of dry, oxygen-free nitrogen or other inert gas as a sparge gas for the system to reduce degradation (due to the presences of dissolved oxygen) of any chemical part of the system, c. Use of heat-driven pump(s) for circulating the mobil phase of the system, and d. Use of the solar collector described (the compound parabolic concentrator) or any other solar collector;

5. The application of the system to:

a. Heat (any gas occuping any) space (i.e., home heating, etc.)
 (i) directly (system heat to gas)
 (ii) indirectly (system heat to liquid to gas)

b. Heat liquid or solid objects (i.e., heat exchangers, etc.);

c. Since the conversion of quadricyclene to norbornadiene can result in a phase change (liquid to vapor) of the mixture, any use of this property is included within the scope, such as direct or indirect drive of turbines, pumps, and any other machine for whatever purpose; and 6. The application of the system as either an auxiliary heat source or as a sole source of heat for whatever purpose, including operation of engines by heat directly or indirectly as in the steam automobile.

Figure 3:
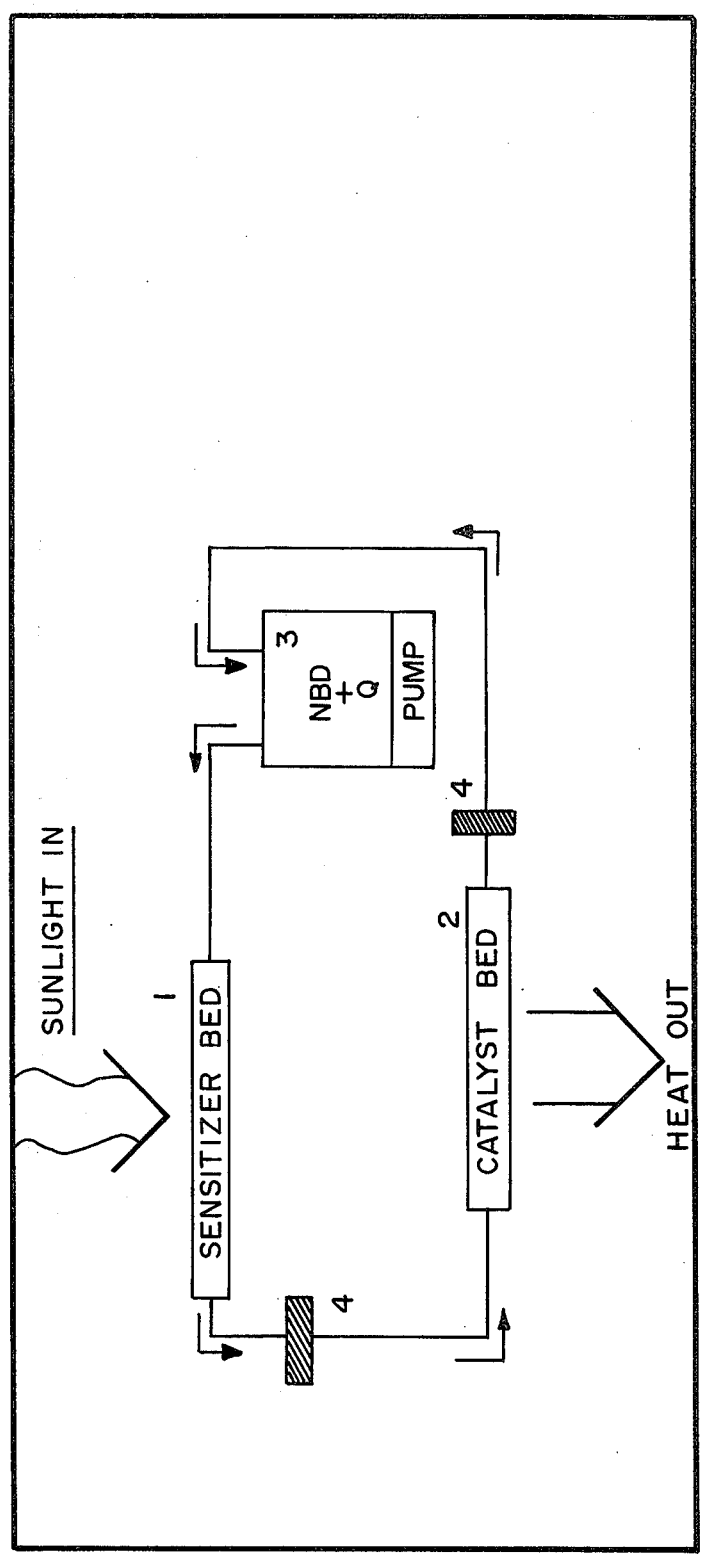
FIGS. 3, 4 and 5 show configurations of solar energy systems.
Figure 4:
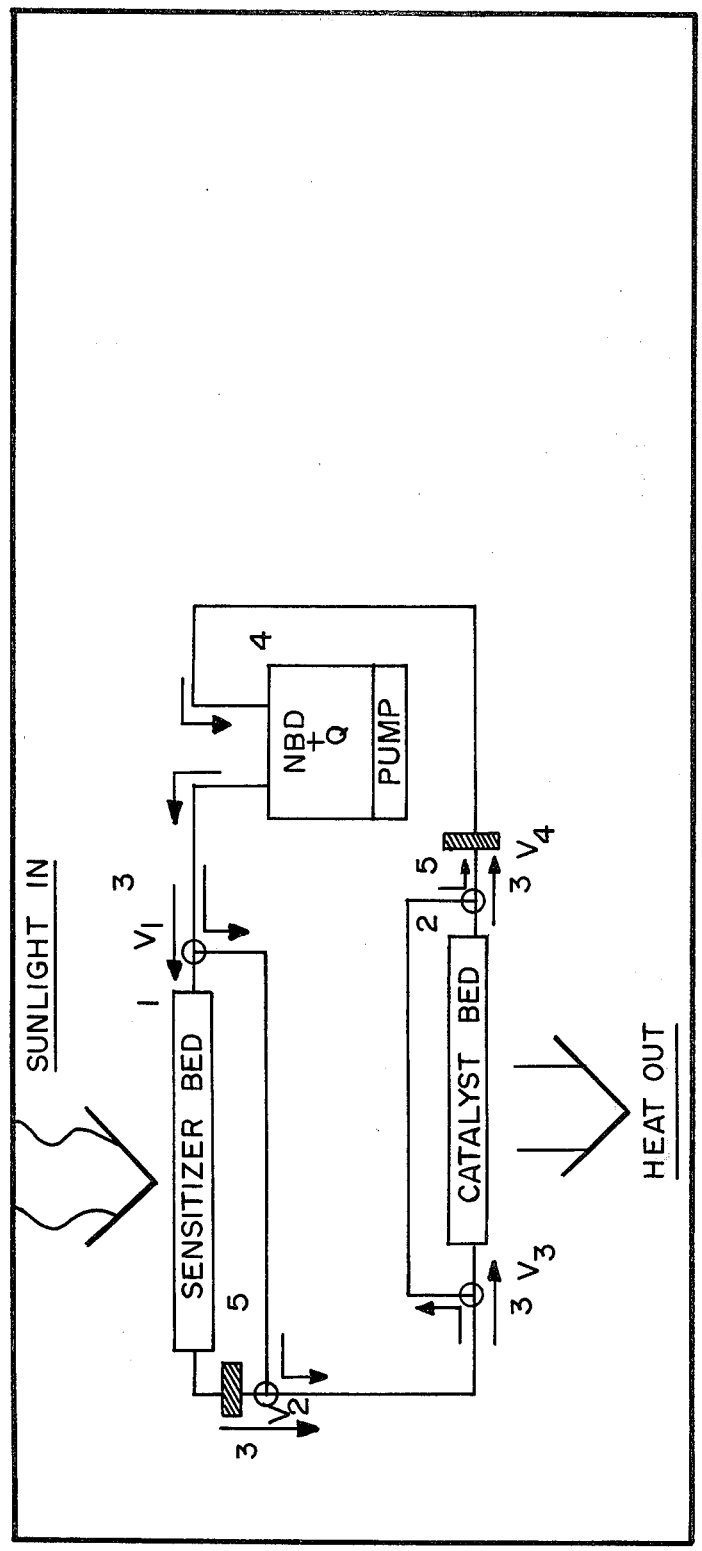
Figure 5:
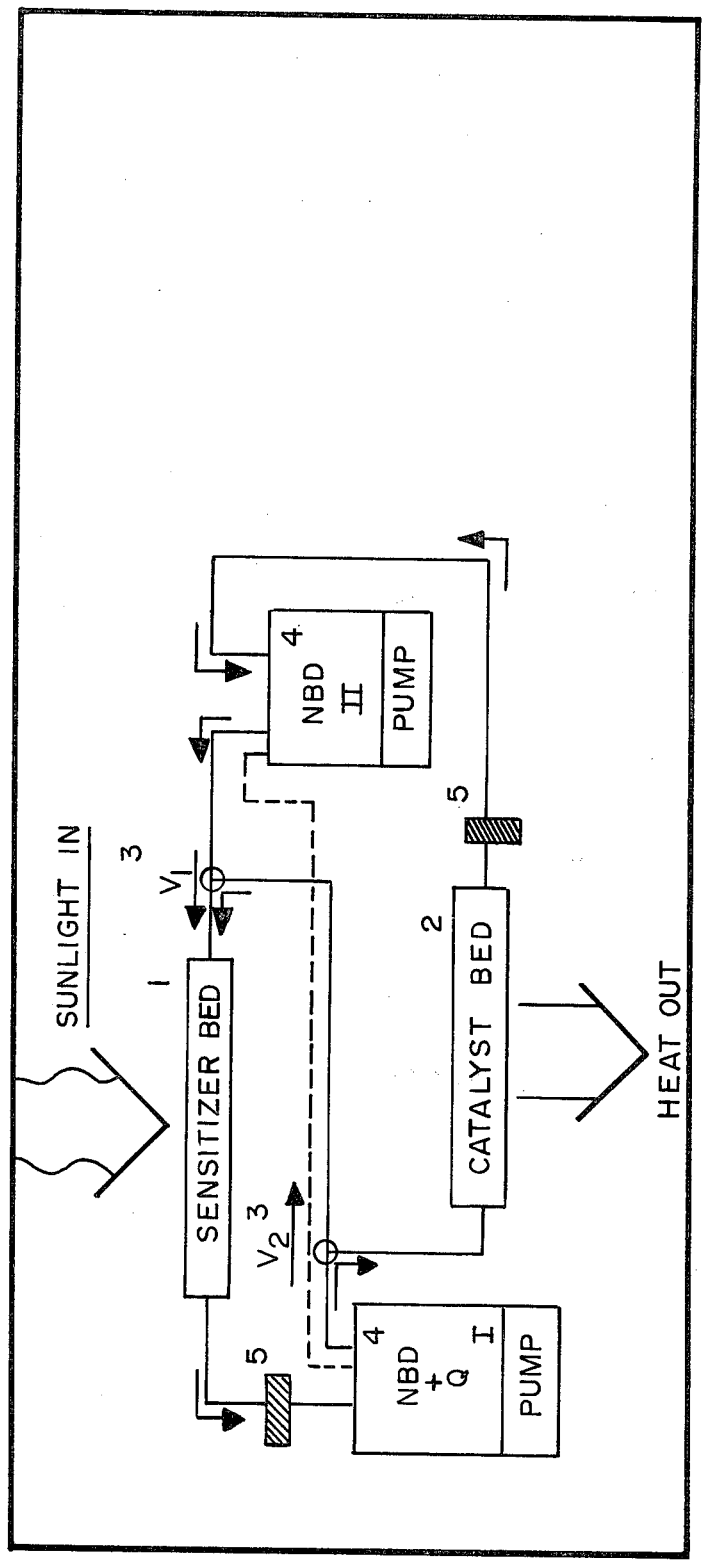

FIGS. 3, 4 and 5 are to provide the reader with a means of visualizing the several applications of solar fuel. All of the configurations shown depend on the same basic flow pattern, that shown in Configuration 3; therefore, the other two configurations may be regarded as extensions of 3. It should be noted that any configuration is a closed loop and detailed specifications are deleted for the sake of clarity. A brief description of each configuration follows, with attention to the differences among them.

Referring to Configuration 3, the reservoir is shown in association with a pump whose purpose is to circulate the contents of the reservoir, first through the sensitizer bed/collector where a mixture of NBD and Q emerges. The fraction of the effluent that is Q depends on: the flow rate, size of the sensitizer bed/collector, and the light intensity at the sensitizer bed/collector; however, it can approach 60% with a single pass. The effluent of the sensitizer bed/collector then passes through the catalytic bed/heat exchanger where any Q is converted to NBD and heat (260 cal/gm of Q). This conversion can take place with near unit efficiency. The effluent of the catalytic bed/collector is then fed into the reservoir. The pumping rate or flow rate is the same in all parts of the system since only one pump is used; thus, the rate at which heat can be provided is controlled by the rate at which Q can be formed. It is clear that this configuration will provide no heat when the light intensity is low (i.e., at night). However, this configuration requires the minimum amount of apparatus and control and thus would be the least expensive to build. Albeit, the applications of this configuration are limited; some of them are: space heating where only daytime operation is required, an auxiliary or backup heating system to heat another heat storage medium such as another liquid or a solid material.

Configuration 4 is an extension of the first configuration and has considerably more flexibility through the use of valving and alternate flow patterns. With each of the valves in the flow-through position, Configurations 4 and 3 are equivalent. However, three other flow patterns are possible, namely: $V_1$ and $V_2$ in the shunt position and $V_3$ and $V_4$ in the flow-through position; $V_1$ and $V_2$ in the flow-through position and $V_3$ and $V_4$ in the shunt position; and $V_1$, $V_2$, $V_3$ and $V_4$ in the shunt position. The first of the three flow patterns listed causes the contents of the reservoir to be passed through the catalytic bed/heat exchanger but the sensitizer bed/collector is bypassed. This flow pattern would be used when light intensity is low (i.e., at night) and Q could not be formed. Its use would serve to reduce the hydrostatic head against which the pump works, and conserve the ambient heat of the liquid. The second of the three flow patterns listed caused the contents of the reservoir to pass through the sensitizer bed/collector but not through the catalytic bed/heat exchanger. With this flow pattern, Q is formed but not used. This flow pattern would find use when light intensity was substantial (daytime) but heat demand low. In this flow pattern, the concentration of Q would rise with each pass of the reservoir's contents over the sensitizer bed/collector. If $V_3$ and $V_4$ are proportioning valves, a fraction of the effluent from the sensitizer bed/collector can be sent through the catalytic bed/heat exchanger and the remainder sent on to the reservoir. In this way, a low heat demand could be supplied while maximizing the concentration of Q in the reservoir. This flow pattern might be used in a cold night/warm or cool day type of situation. The third of the three flow patterns listed is trivial, although would be useful during servicing of the filters and both catalytic and sensitizer beds. It is clear that for any of the flow patterns listed, the flow rate is uniform throughout the system (except when $V_3$ is used as a proportioning valve) because only one pump is used. Also, for flow pattern two, or any time the heat demand exceeds the rate at which Q is formed, the system's capacity to respond to a heat demand falls off exponentially because of dilution effects.

Configuration 5, also an extension of Configuration 3, will accomplish everything Configurations 3 and 4 can; however, different flow rates may be used through the sensitizer bed/collector and catalytic bed/heat exchanger. The use of two pumps and two reservoirs adds this feature and provides additional flexibility. The use of the two pump/two-reservoir permits the isolation of the NBD-Q mixture so that the concentration of Q can be maximized and the concentration of Q in the reservoir feeding the catalytic bed/heat exchanger is only either constant or increasing. In this way, dilution effects are eliminated, a clear advantage over Configurations 3 and 4. The three flow patterns allowed are: $V_1$ in the shunt position and $V_2$ in the flow-through position; $V_1$ in the flow-through position and $V_2$ in the shunt position. The first flow pattern permits the conversion of NBD to Q without Q being used, and a buildup of the concentration of Q in Reservoir I. The second flow pattern ($V_2$ in the shunt position) permits response to a heat load by passing Q over the catalytic bed/head exchanger, converting it to NBD and heat. The effluent, NBD, is fed into Reservoir II. The concentration of Q is constant, since no dilution in Reservoir I occurs. The third flow pattern ($V_1$ in the flow-through position) causes the contents of Reservoir II, NBD, to pass through the sensitizer bed/collector converting the NBD to Q, and then on to Reservoir I. In this flow pattern, normally only one pump is run at any given time; and the entire volume of Reservoir II would be passed over the sensitizer bed/collector and flow into Reservoir I. Once transferred, the flow pattern would be altered to either the first or second one described above. In this configuration, either reservoir must be large enough to contain the entire liquid volume of the system. The dotted line shown connects the spaces of the reservoirs so that a vacuum is not created in either reservoir during fluid transfer.

FIG. 6 shows the physical orientation of the semipermeable membrane, mechanically rigid transparent tube and single trough from the compound parabolic concentrator CPC (solar collector).

Because of the efficiency and stability of our catalyst (to be described in detail below) it is possible to elevate the temperature of the photochemical fluid to high temperatures, for instance 140° C.) which is a temperature in excess of that needed to cause a liquid to gas phase change. By application of this characteristic to a heat engine, and/or a carnot engine and/or a heat pump useful work can be performed.

The interconversion of heat and mechanical energy

A motor can be defined as a device for obtaining mechanical energy from some other form of energy. A motor which converts heat energy into mechanical energy is known as a heat engine. Examples of heat engines include: the conventional piston steam engine, the Diesel engine, two-cycle and 4-cycle gasoline motors, jet motors, rockets and steam and gas turbines. In all of these, heat energy is usually obtained from the chemical energy contained in some fuel. (Some examples of motors which are not heat engines include: electric motors, water wheels, hydraulic turbines, falling weights—spring driven devices and wind mills). It has not yet been possible to devise any other economical, large scale method for transforming chemical energy into mechanical energy that does not involve a preliminary transformation of chemical energy into heat or thermal energy.

A heat pump is a contrivance which, by doing mechanical work, removes heat energy from a body at a low temperature and injects it into another body at a higher temperature. Examples of heat pumps are mechanical refrigerators, air conditioners and certain types of heating units.

An important property of all motors and pumps is that as they convert one form of energy into another they must themselves repeatedly pass through a closed cycle of states where a state of the system is defined by the values of any two of the thermodynamic state variables, pressure (P) temperature (T) and volume (V). For example a motor cannot be changed permanently by the energy conversion it performs; otherwise it would only be able to perform a finite amount of work.

For the closed cycle mentioned above using as an example an ideal gas heat engine with an ideal gas confined in a cylinder equipped with a frictionless piston and enclosed in a constant temperature bath, four steps are considered that completely describe the cycle. The thermodynamic quantities involved with each step is shown in the table below.

TABLE

| step #/description | Energy change | Work done | Heat absorbed |
|---|---|---|---|
| 1/reversible isothermal expansion at $T_{high}$ | $\Delta E_1 = 0$ | $W_1 = RT_h Ln\left(\dfrac{V_{1h}}{V_{2h}}\right)$ | $q_1 = RT_h L_n\left(\dfrac{V_{1h}}{V_{2h}}\right)$ |
| 2/reversible adiabatic (no heat flow) expansion $T_h \quad T_c$ | $\Delta E_2 = \displaystyle\int_{T_h}^{T_c} C_v dT$ | $W_2 = -\Delta E_2$ | $q_2 = 0$ |
| 3/reversible isothermal compression at $T_c$ | $\Delta E_3 = 0$ | $W_3 = RT_c L_n\left(\dfrac{V_{2c}}{V_{1c}}\right)$ | $Q_3 = RT_c L_n\left(\dfrac{V_{2c}}{V_{1c}}\right)$ |
| 4/reversible adiabatic (No heat flow) compression $T_c \quad T_h$ | $\Delta E_4 = \displaystyle\int_{T_c}^{T_n} C_v dT$ | $W_4 = -\Delta E_4 = \Delta E_2$ | $q_4 = 0$ |
| Total cycle | $\Delta E_{Total}=0$ | $W_{Total}=W_1+W_2+W_3+W_4$ | $q_{Total}=q_1+q_2+q_3+q_4$ |

In the above table the variables are designated as follows:
$\Delta E$ = the change in internal energy of the ideal gas
$W$ = Work
$q$ = heat
$T_h$ = high temperature
$T_c$ = low temperature
$V_{1h}$ = larger volume at $T_h$
$V_{2h}$ = smaller volume at $T_c$
$V_{1c}$ is larger than $V_{1h}$
$V_{2c}$ is larger than $V_{2h}$
$R$ = the gas constant
$C_v$ = the specific heat of the gas at constant volume Realizing that for a reversible adiabatic expansion of a non-polytropic gas starting at $V_1$ and $T_1$, the final volume $V_2$ and temperature $T_2$ are related as follows:

$$Ln\frac{V_2}{V_1} = \frac{1}{R}\int_{T_1}^{T_2}\frac{C_v}{T}dT; \text{ then}$$

it can be shown that $$W_3 = -\frac{T_c}{T_h} W_1 \text{ and } q_3 = -\frac{T_c}{T_h} q_1 = \frac{T_c}{T_n} q_h$$

where $q_h$ is the heat absorbed from the heat thermal reservoir in the high temperature isothermal expansion. Thus the net output of work in one complete cycle of the heat engine under discussion is $$w_{net} = q_h - E_2 - \frac{T_c}{T_h} q_h + E_2 = q_h \frac{T_h - T_c}{T_h}; \text{ and the net}$$

heat absorbed is $$q_{net} = q_h - \frac{T_c}{T_h} Q_h = q_h \frac{T_h - T_c}{T_h}$$

or the net work equals the net heat.

It might be thought that because of this equality that the heat to work conversion is carried out with 100% efficiency; however such a definition is without significance. However, by noting that an amount of heat, $q_h$, is absorbed during step 1 or the high temperature isothermal expansion, it is reasonable to write an expression for efficiency (e) as the ratio of the output to input or $$e = \frac{W}{q_h} = \frac{T_h - T_c}{T_h}$$

Thus if $T_h=600°$ k. and $T_c=300°$ k. then the maximum efficiency that could be expected would be 0.5.

If the ideal gas heat engine described above were run in reverse, it would define a heat pump. Work would be performed on the engine and the effect of this operation would be absorption of heat from the cold, reservoir and expulsion of heat to the hot reservoir; thus heat would be moved against a temperature gradient in a fashion analogous to that of an ordinary pump that moves a fluid against a pressure head.

If the ideal gas heat pump is used as a refrigerator it can be shown by argument similar to those above that the efficiency can be measured as the ratio $$e = \frac{\text{heat removed from cold reservoir}}{\text{work needed to operate pump}} = \frac{q_c}{W} = \frac{T_c}{T_n - T_c}$$

If the heat pump is being used to heat some object, the efficiency can be measured as the ratio $$e = \frac{\text{heat expelled to hot reservoir}}{\text{work needed to operated pump}} = \frac{q_h}{W} = \frac{T_h}{T_h - T_c}$$

It can also be shown that these expressions give the upper limits to the efficiencies of any heat pump and are not limited to the ideal gas heat engine used as a heat pump. The same is true of the efficiency of the ideal gas heat engine described above.

The operation of a heat engine in which the working substance is an ideal gas has been discussed in some detail above. Certain properties of this heat engine are, however, independent of the working substance employed in the engine and would be found if other substances were used such as water near its boiling point. An idealized heat engine shall now be considered, the working fluid of which can be any substance, not necessarily an ideal gas. This engine is known as a Carnot engine and operates on the following cycle:

Step 1: Reversible isothermal expansion of the working substance at temperature $T_h$, in which heat $q_h$ is absorbed from a hot reservoir also at $T_h$, Step 2. Reversible adiabatic expansion in which the temperature of the working substance is caused to drop from $T_h$ to $T_c$ without any heat being absorbed, Step 3. Reversible isothermal compression of the working substance at temperature $T_c$ in which heat—$q_c$ is expelled to a thermal reservoir at $T_c$ (note that in general $q_c$ will be a negative quantity), and Step 4. Reversible adiabatic compression of the working substance in which the engine is returned to its state at the beginning of step 1 with a return to temperature $T_h$ and no heat exchanged with the surroundings.

As was the case for the ideal gas heat engine described above $\Delta E_{overall}$ was zero since the engine ends up in exactly the same state at which it began, however, $\Delta E_1$ and $\Delta E_2$ may not be zero. Because $\Delta E_{overall}$ is zero, the net work (W) is equal to the net heat change ($q_h + Q_c$) by the first law of thermodynamics. It is noted that in the Carnot cycle all of the steps were reversible. It is this feature that makes the Carnot engine an idealized concept unattainable in practice. However, the theoretical discussion serves to define the real processes occurring for the purpose of illustration and to define the upper limit of performance. Thus a basis for comparison as well as a means of understanding a practical system is provided.

As mentioned before, by means of a suitable catalyst such as the cobalt porphorin, very high temperatures (for example 140° C.) can accompany the conversion of quadricyclene (Q) to norbornadiene (NBD). Temperatures of this magnitude will cause a liquid-to-gas phase change; and if this reaction occurs in a closed vessel superheating can occur (due to the difference in the heat capacities of the liquid and gas phases) giving rise to even higher temperatures, several hundred degrees for example. This feature of the NBD-Q system makes it possible to use solar radiation stored in Q to provide the energy to drive a heat engine and/or heat pump in a new and unique manner.

In particular three of the possible heat engine configurations or applications are considered, Example 1, where NBD-Q is the working substance and the fuel and Example 2, where the heat catalytically released from Q is used to heat a separate and different working substance. Example 3 is one in which the catalytic conversion of Q to NBD and the accompanying liquid-to-gas phase change is used to drive a turbine.

Furthermore, one example of heat pump application or configuration is given where the catalytic conversion of Q to NBD and the accompanying liquid-to-gas phase change is employed.

These comments are not meant to eliminate other configurations or applications the performance of useful work by the cyclical motion of a piston in a cylinder is used as an example.

In order to aid in understanding the proposed use, the normal operating cycle of a simple steam engine (which is a heat engine) is described. A simple steam engine requires, in general, a cylinder with movable piston, a fuel supply, a burner, a boiler, a working substance (such as water), a condenser and miscellaneous hardware such as valving and fluid conductors and the like. Fuel supplied to the burner is the source of energy which is converted into mechanical energy and/or useful work. The working substance, water for example, is placed in the boiler where it is heated to a high temperature and undergoes a phase change from liquid water to gaseous water. When the piston-cylinder relationship is such that a relative minimum volume exists above the piston the superheated (high pressure) steam is allowed to enter the cylinder and expand by driving the piston to a position such that a maximum or near maximum volume exists above the piston. At this time the cylinder is vented to the condenser where the low pressure steam is condensed, that is another phase change occurs (steam to liquid water). The liquid water thus formed is re-introduced into the boiler so that the process can be repeated. In the meantime the piston is returned to its starting position by some means such as a flywheel or a second piston in opposition to it. In this type of heat engine heat losses are incurred in several ways such as: inefficient burning of fuel, inefficient heat transfer to the working substance and deliberate heat loss in the condenser where steam is converted to liquid water.

EXAMPLE 1

With this in mind, example 1 is considered where NBD-Q is the working fluid and fuel. A simplified configuration of the heat engine in this case would require: the work substance, NBD and/or Q, a cylinder with movable piston, the catalyst bed, an NBD reservoir, an NBD and/or Q reservoir and miscellaneous hardware such as valving, fluid conductors and the like. In case 1 the working substance NBD and/or Q is introduced directly into the cylinder when the position of the piston in the cylinder is such that a relative minimum volume exists above the piston. The catalyst is immobilized inside the cylinder in the manner and by the chemical techniques described above. The site within the cylinder at which the catalyst is chemically immobilized depends on the nature of the various surfaces within the cylinder. As mentioned above the preferred catalyst can be chemically bound to silicatious surfaces such as glass, silica, silica gel and the like, as well as oxidized aluminum and in some cases copper and copper oxide surfaces. Thus with surfaces such as those mentioned, being provided within the cylinder the catalyst can be chemically bound to it/them by the chemical immobilization techniques described in detail above. Otherwise stated, the surface within the cylinder to which the catalyst is to be chemically attached must be one that lends itself to or is suitable for chemical attachment of the catalyst. The specific surface within the cylinder to which the catalyst is attached would comprise the entire internal surface of the cylinder in an ideal case; however, such coverage can be lessened with little loss in performance. In either case however, the catalyst should be located within the cylinder so that the working substance—fuel makes good contact. For example if the working substance—fuel were introduced into the cylinder through the cylinder head or end the catalyst should be located on the surface of the cylinder at and near the point of entry that is the end or head of the cylinder. Similarly, a high surface area, porous, silicatious plug to which the catalyst is chemically bound can be located in the cylinder head or end and the working substance—fuel introduced into the cylinder through the plug.

(Herein the terminology "NBD and/or Q" is meant to denote the fact that either a mixture of NBD and Q or Q alone comprises the working substance.)

The conversion of Q to NBD occurs in the cylinder causing a sudden change in internal pressure (due to the liquid-to-gas phase change) causing the piston to move so that the internal pressure is decreased. When the piston has moved far enough so that a relative maximum volume exists above the piston, the Q and/or NBD vapor is vented to the NBD reservoir.

(Herein the terminology "Q and/or NBD" is meant to denote the fact that either a mixture of Q and NBD or NBD alone comprises the working substance due to the fact that the conversion of Q to NBD though nearly quantitative, there may be trace amounts of Q in the NBD).

The NBD can then be passed through the solar collector thus forming more Q and the cycle can be repeated on a continuous basis. The solar collector mentioned is that described in detail earlier in this description. The Q thus formed is either re-cycled through the solar collector so that the relative concentration of Q is increased or it is deposited directly in the NBD and/or Q reservoir from which the working substance-fuel is drawn for the heat engine.

EXAMPLE 2

Example 2 differs from example 1 only in the following respects: the work substance is a substance other than NBD and/or Q and NBD and/or Q is used only to heat the working substance by the catalytic release of heat from Q with the heat thus derived transmitted through a suitable heat exchanger to the working substance. The working substance then acts in a manner similar to that described for a simple steam engine.

EXAMPLE 3

The liquid-to-gas phase change of Q and/or NBD by catalytically converting Q to NBD can be made to drive a turbine, another example of a heat engine. By passing the high pressure NBD and/or Q vapor through a suitable jet or nozzle, a high velocity stream of vapor can be directed on to the blades of a turbine causing rotary motion of turbine fan. The method in its simplest form used to accomplish this end is as follows: Q is pumped from the Q reservoir through a check valve to the nozzle. The orientation of the check valve is such that Q can only flow in the direction of the nozzle; that is if a pressure greater than that produced by the pump develops in the nozzle or vicinity of the nozzle, the fluid could not be forced thereby toward the reservoir through the pump. The catalyst used to affect the catalytic conversion of Q to NBD is located in or near the nozzle tip, for example by attaching or fixing in a suitable manner a porous silicaceous or porous plug of other suitable manerial, upon which the catalyst is immobilized by the chemical means described earlier, in the nozzle so that the fluid Q is forced through it, high local pressures are developed due to the phase change that occurs when Q is catalytically converted to NBD. Under these conditions a high velocity stream of NBD vapor is developed in the nozzle tip and in a direction away from the tip. The high velocity stream of vapor thus formed is directed into the blades of the turbine fan where the kinetic energy of the high velocity stream of vapor is transferred to the fan as rotational motion. Obviously a multiplicity of such nozzle-check valve-catalyst plug assemblies could be placed around the fan of the turbine so that a greater total amount of kinetic energy is delivered at the fan blade site and thereby create rotary motion of broader application. The fate of the vapor after it loses its kinetic energy to the fan blade of the turbine is that of reduced temperature and condensation after which it is conducted by piping or fluid conductors to the NBD reservoir. As was the case in the previous examples, Q may then be formed by passing the NBD through the solar collector and the cycle repeated. By sizing the means of producing Q properly with respect to the demand for Q, continuous operation of the turbine can be brought about.

In the theoretical discussion presented above, the operation of a heat pump was discussed with examples given. It was stated that a heat pump can be regarded as a heat engine run in reverse, that is heat is removed from a cold reservoir and transferred to a hot reservoir by the expenditure of work. The refrigeration units found in air conditioners, freezers, refrigerators and the like are examples of heat pump applications. Because Q can be utilized to perform work, as was described in the context of a heat engine as the working substance-fuel it can also be used as the working substance-fuel in a heat pump and therefore refrigeration applications are possible. Several examples are considered and listed below: (4) NBD and/or Q as the working substance-fuel otherwise known as the refrigerant; (5) a mixture of NBD and/or Q and a common refrigerant such as fluorinated hydrocarbons (freon 12 for example); and (6) Q is employed as the source of heat used to cause a liquid-to-gas phase change in a common refrigerant such as fluorinated hydrocarbons (freon 12 for example) by means of a heat exchanger, that is Q is not mixed with the refrigerant. Or Q is used to drive a heat engine as described above which in turn supplies the mechanical energy to drive the compressor of any type of refrigeration unit.

In order to properly orient these examples of the NBD-Q driven heat pumps, it is necessary to make a few preliminary comments regarding the ordinary operation of a heat pump and in particular a refrigeration unit (which is a heat pump). Because of the fact that the working substance is also the fuel, a unique sort of heat pump is possible. The cycle generally followed by a heat pump used as a refrigeration unit (in its simplest form) is as follows: the working substance is caused to undergo liquid-to-gas phase change and the gaseous phase after being compressed and cooled, is expanded into a heat exchanger with the accompanying reduction in temperature in the heat exchanger, where condensation (gas-to-liquid phase change) of the working substance (refrigerant) or super cooling of the working substance vapor or some combination thereof occurs. When the temperature of and in the heat exchanger falls below the temperature of the fluid (air, other gas or liquid) to be cooled, heat flows from the fluid and its temperature is reduced or cooling occurs. The condensed working substance and/or its vapor is warmed and passed from the heat exchangers sometimes called the condenser) into the part of the heat pump where it is re-heated until a liquid-to-gas phase change occurs and the cycle can be repeated. Ordinarily the cycle is repeated on a continuous basis so that cooling is continuous.

EXAMPLE 4

In this example Q and/or NBD is the working substance-fuel and refrigerant and is utilized in the following manner. Q is placed in contact with the catalyst so that a liquid-to-gas phase change occurs in a vessel that is constructed so that the heat of vaporization can be drawn off or in some way removed to be discarded or otherwise used for some useful purpose. When the temperature of the NBD vapor has dropped to near its boiling point, the vapor is then expanded into a larger vessel known as a heat exchanger and is the site of the desired refrigeration. Expansion into the heat exchanger results in rapid cooling, even supercooling, with the heat exchanger becoming much colder than the fluid to be cooled. As this fluid passed across the heat exchanger it loses heat to the heat exchanger, and is therefore cooled while at the same time the NBD vapor is warmed. The warmed condensed NBD is then conducted to the NBD reservoir and from there can be passed through the solar collector so that more Q can be formed and the cycle repeated; thereby refrigeration is carried out on a continuous basis if desired. Storage of Q with controlled or periodic utilization is clearly possible and desirable in many cases.

EXAMPLE 5

In this example a common refrigerant is mixed with NBD-Q such as fluorinated hydrocarbons (freon 12 for example). The operation of the heat pump would be exactly the same in principal as described in the previous example; however, certain performance can be controlled and the fire hazard associated with NBD-Q is thereby either vastly reduced or eliminated. The performance of any refrigeration unit or heat pump depends on the heat of vaporization of the refrigerant regardless of its chemical nature. Likewise the temperature at which vaporization occurs defines the cooling capacity and thus imposes some engineering restrictions on the physical size of the various components that comprise the heat pump and ancillary apparatus. Thus by forming a well specified mixture of NBD-Q and other refrigerant the heat of vaporization and the temperature at which vaporization of the mixture occurs can be adjusted as necessary to satisfy engineering constraints on the designs of a specific heat pump.

According to Farrington Daniels in "Direct Use of the Sun's Energy" if overall electricity production efficiency of about 0.1 could be achieved by using a heat engine such as those described, the economics of producing electricity in this manner would be favorable. It is calculated that the upper limit of efficiency for the NBD-Q system for use on driving a heat engine as described above is 0.35 and could be greater in terms of conventional fuel because of the minimization of heat losses.

EXAMPLE 6

In this example Q is employed only as a source of heat used to cause a liquid-to-gas phase change in a common type refrigerant such as fluorinated hydrocarbons (freon 12 for example). In this example the refrigerant and NBD-Q are not mixed but rather separated either by a suitable heat exchanger or a heat engine used to drive a typical compressor pump. In the latter configuration the compressor of any type of refrigeration unit would be driven or have its mechanical energy supplied by a heat engine as described above using Q and/or NBD as the working substance-fuel. In the former case however, Q is brought in contact with the catalyst to form NBD and heat. By means of a suitable heat exchanger, the heat thus generated would be transmitted to a common type of refrigerant such as fluorinated hydrocarbons (freon 12 for example) causing a liquid-to-gas phase change of the refrigerant. The subsequent operation of the refrigeration unit would follow the steps outlined in the first example of heat pump applications. Thus in this manner solar energy stored in Q can be used to drive a heat pump for whatever reason.

It is proposed that certain inert flame resistant and retardant types of organic liquids be added to NBD-Q so that the fire hazard of NBD-Q be substantially reduced or eliminated. Organic liquids such as fluorinated hydrocarbons are useful in this regard; however, certain chlorinated hydrocarbons are also useful. The fluorinated hydrocarbons are preferred in this regard however, due to their relative inertness or low reactivity with respect to the chemical components of the solar energy storage and retrieval system described earlier. The use of nitrogen gas as a sparge as well as a displacement gas for oxygen reduces the fire hazard substantially; however, the use of nitrogen gas along with certain fluorinated hydrocarbons reduces further the overall flammability of the system while not appreciably affecting the overall performance of the system.

It has been repeatedly mentioned in the foregoing that NBD and/or Q was a fuel. Reference has also been made to the ability of NBD-Q (the mixture) to act as the working substance in a thermodynamic context, when used in conjunction with a heat engine and/or a heat pump; and in this context NBD-Q has also been referred to as a refrigerant. Thus, either a mixture of NBD and Q, or Q alone can act in a multiplicity of roles simultaneously that is as a fuel, as a working substance (in a thermodynamic sense) and as a refrigerant. Because no other substance can act in such a multifaceted manner, this substance (NBD-Q) is regarded as truly unique.

Furthermore, as our research has continued since our earlier filed application, we have determined that a further example can be added with respect to the means for immobilizing the catalysts and photosensitizers involved as set forth in the following:

The $R_2$ groups are selected so that they possess active sites to which the photosensitizer and heat release catalyst can be convalently bound. The following list though not exhaustive, shows representatives of those titanium based coupling agents with organic functional groups useful to chemically bind photosensitizer and catalyst molecules.

(1) isopropyl-4-aminobenzenesulfonyl-di(dodecylbenzenesulfonyl-titanate
(2) isopropyl di(4-aminobenzoyl) isostearoyl titanate
(3) isopropyl trianthranil titanate
(4) isopropyl tri(methoxyphenyl) titanate
(5) isopropyl tri(N,N-dimethyl-ethylamino) titanate
(6) isopropyl tri(N-ethylamino-ethylamino) titanate
(7) isopropyl triricanoyl titanate
(8) isopropyl trimethacryl titanate
(9) tetra (2,2-diallyloxymethyl-1-buteneoxy) titanium di(di-tridecyl) phosphite
(10) tetraoctyloxy titanium di(dilauryl phosphite)
(11) titanium di(dioctylphosphate) oxyacetate
(12) titanium 4-aminobenzene sulfonate dodecylbenzene sulfonate oxyacetate
(13) titanium dianthranilate oxyacetate
(14) di(dioctylpyrophosphato)ethylene titanate

(15) dianthranil ethylene titanate.

Virtually all of the useful photosensitizers and their derivatives that exist can be immobilized using organo functionalized titanates (one of those listed or not listed above). The photosensitizers of interest are those that can transfer energy from one of their excited states to the excited state manifold of NBD. A few representative photosensitizers are listed elsewhere in this application.

The chemical reactions employed to chemically bind any of the photosensitizers listed explicitly or implicitly to a particular titanium organic functionality first involves chemically attaching the titanium coupling agent to the silica substrate or surface. With the titanate coupling agents, the coupling is accomplished merely by exposing the silica substrate to the titanate.

For example 50 grams of quartz wool is immersed in isopropyl tri N-ethylamino ethylamino titanate for a short period of time, i.e., one hour. The quartz wool thus treated when removed is washed with acetonitrile repeatedly and allowed to dry at room temperature. Acetophenone, a photosensitizer, can be chemically bound to the terminal amino functionalities of the titanate used by reacting p-acetyl benzaldehyde in the solvent, hexamethyl phosphoric triamine, by immersing the titanate treated quartz wool in the mixture for an hour. The quartz wool thus treated is removed, washed with alcohol and dried. The resulting acetophenone functionalized-titanate-quartz wool can be verified spectroscopically.

Immobilization of the heat release catalysts referred to elsewhere in this application follows similar chemical pathways as described for immobilizing acetophenone above.

Furthermore, research has also caused us to realize that the principles of the invention are applicable also to other photoisometric systems.

Though NBD-Q photoisomers present one of the best photochemical energy storage systems, others that can perform similarly are worth mentioning. However, there are several striking differences between NBD-Q and those listed below. The photoisomer systems listed do not generally require a catalyst to cause reversion from the high energy isomer to the low energy isomer but rather heat. Also some of those listed do not require a photosensitizer, however, in every case they can be used to increase the wavelength range over which photo induced isomerization occurs.

I. Photodimers of Anthracenes
(A) dianthracene - Energy density: 42 KJ/mole
118 J/gram
Wavelength limit: Max = 400 m
Temperature causing heat release: 220°-250° C.
(b) 9-cyanoanthracene
Energy density: 83.6 KJ/mole
206 J/gram
Wavelength limit: Max = 500 nm
Temperature causing heat release: 127°-162° C.

II. Photodimers in the Naphthalene Series
(A) 2-methoxynaphthalene
(1) trans phenyl groups
energy density: 57 KG/mole
150 J/gm
Wavelength limit;: 370 nm
Temperature causing heat release: 150° = 210° C.
(2) Cis phenyl groups
Energy density: 63 KJ/mole
198 J/gm
Wavelength limit: max - 370 nm
Temperature causing heat release: 170°-230° C.

-continued
(B) Naphthalene esters
Energy density: 189 KJ/mole
414 J/grams
Wavelength limit: max - 430 nm
Temperature causing heat release: 190°-260° C.
(C) Nitriles
Energy density: 137 KJ/mole
477 J/grams
Wavelength limit: max = 440 nm
Temperature causing heat release: 170°-270°C.

III Naphthalene - diphenylacetylene Photo adducts
(A) 1,2-diphenyl - 2a, 86-dihydrocyclobuta
[a] naphthalene
Energy density: 400 J/gm
Wavelength limit: 370 n,
Temperature causing heat release: 200° C.
(B) Dicyclopentadiene-1-one
Energy density: 68.6 KJ/mole
470 J/gm
Wavelength limit: max = 380 nm
Temperature causing heat release: 25° C.

IV 1-Ethoxycarbonyl-1H—Azepine
Energy density: 43.5 KJ/mole
263 J/gm
Wavelength limit: 458 nm
Temperature causing heat release: 113°-143° C.

The photosensitizers and the like already mentioned are generally useful in extending the wavelength range over which photo induced isomerization occurs for those photoisomerization systems listed above. However, no catalysts are required for the photoisomerization systems listed above. Heat release is accomplished by raising the temperature of the high energy isomer.

Accordingly, I intend to be limited only by the following patent claims:

1. A solar energy system comprising neat NBD, a photosensitizer in whose presence in sunlight NBD is isomerized to Q, a catalyst in whose presence Q is reisomerized without internal heat to regenerate NBD, and a separating device for the purpose of local concentration of at least one of these ingredients.

2. The system of claim 1 in which the photosensitizer has an absorption spectrum which overlaps both the electronic absorption spectrum of NBD and the sun's emission spectrum.

3. The method of storing and retrieving solar energy in the form of heat which comprises exposing neat NBD to sunlight in the presence of a photosensitizer, isomerizing NBD to its isomer Q, removing Q from the sunlight with the assistance of a separating means, without added external heat, and exposing Q to a catalyst to release said absorbed solar energy in the form of heat while regenerating NBD from isomer Q.

4. The method of claim 3 in which the photosensitizer has an absorption spectrum which overlaps both the electronic absorption spectrum of NBD and the sun's emission spectrum.

5. The solar energy system comprising NBD, a photosensitizer in whose presence in sunlight NBD is isomerized to Q, a catalyst in whose presence Q is re-isomerized to regenerated NBD, at least one of said catalyst and sensitizer being held in chemical attachment to an insoluble silanized matrix.

6. A solar energy system comprising a photosensitizer having an absorption spectrum which overlaps both the electrical absorption spectrum of NBD and the sun's emission spectrum and in whose presence in sunlight NBD is isomerized to Q, a catalyst in whose presence Q is reisomerized to re-generate NBD, each of said photosensitizer and catalyst being held in chemical attachment to an insoluble silanized matrix, and at least one separating device selected from the group consisting of membranes, filters, capillary devices and molecular sieves.

7. The system of claim 6 wherein the NBD-Q system is anhydrous.

8. The method of claim 7 wherein the heat of reisomerization is confined with the NBD generated to vaporize the latter.

9. The method of storing and retrieving solar energy in the form of heat which comprises exposing NBD to sunlight in the presence of a photosensitizer having an absorption spectrum which overlaps both the electric absorption spectrum of NBD and the sun's emission spectrum, said photosensitizer being held by chemical attachment to a silanized matrix, thus isomerizing NBD to Q, removing Q from the sunlight by the application of a supporting means selected from the group consisting of membranes, filters, capillary devices and molecular sieves, re-generating NBD from Q with the generation of heat without the addition of external heat, by exposing Q to a catalyst held in chemical attachment to a silanized matrix with the recovery of substantially all of the heat of isomerization by removing the NBD from the catalyst area as formed.

10. The method of claim 9 wherein the system of NBD-Q is anhydrous.

11. A solar energy system comprising NBD, a photosensitizer in whose presence of sunlight NBD is isomerized to Q, a catalyst in whose presence Q is re-isomerized to regenerate NBD, and a separating device for the purpose of local concentration of at least one of the ingredients, said photosensitizer being selected from the group of acetophenone, orthobenzyloxybenzaldehyde and 4-(N,N-dimethylamino)-benzophenone.

12. A solar energy system comprising NBD, a photosensitizer in whose presence in sunlight NBD is isomerized to Q, a catalyst in whose presence Q is re-isomerized to regenerate NBD, and a separating device for the purpose of local concentration of at least one of the ingredients, said catalyst being selected from Cobalt (II) porphyrins, elemental iodine and the trizonal prismatic complex $[(CF_3)_2C_2S]_3Mo$.

13. A solar energy system comprising NBD, a photosensitizer in whose presence in sunlight NBD is isomerized to Q, a catalyst in whose presence Q is re-isomerized to regenerate NBD, and a separating device for the purpose of local concentration of at least one of the ingredients, said catalyst being selected from Cobalt (II) porphyrins, elemental iodine and the trizonal prismatic complex $[(CF_3)_2C_2S]_3$ Mo, wherein at least one of the catalyst and sensitizer is held in chemical attachment to an insoluble silanized matrix.

14. A solar energy system comprising NBD, a photosensitizer in whose presence in sunlight NBD is isomerized to Q, a catalyst in whose presence Q is re-isomerized to regenerated NBD, and a separating device for the purpose of said concentration of at least one of the ingredients, said catalyst being selected from Cobalt (II) porphyrins, elemental iodine and the trizonal prismatic complex $[(CF_3)_2C_2S]_3$ Mo.

15. In a method of storing and retrieving solar energy in the form of heat, the step comprising treating with sunlight a photoisomer in the presence of a photosensitizer which has an absorption spectrum which overlaps both the electronic absorption spectrum of the photoisomer and the sun's emission spectrum to form an isomer of higher energy content and removing the isomer through a separating device, in which method the sensitizer is selected from the group of acetophenone, orthobenzaldehyde and 4-(N,N-dimethylamino)-benzophenone.

16. In a method of storing and retrieving solar energy in the form of heat, the step of treating in a nonaqueous system a liquid photo-isomer of high energy content in the presence of a catalyst capable of causing substantial complete conversion of said photo-isomer without the addition of external heat, to a liquid isomer of lower energy content with the release of substantial heat of deisomerization, and removing the converted isomer through a separating device, in which method the catalyst is selected from Cobalt (II) porphyrine, elemental iodine and the trigonal prismatic complex, $[(CF_3)_2C_2S]_3$ Mo.

17. A solar energy system comprising NBD, a photosensitizer in whose presence in sunlight NBD Is isomerized to Q, a catalyst in whose presence Q is reisomerized to regenerate NBD, and a separation device for the purpose of local concentration of at least one of these ingredients, in which system at least one of the photosensitizer and catalyst comprises a silanized substrate selected from the group consisting of glass, silicate gel, alumina, molecular sieve, metal and metal oxides.

18. A solar energy system comprising NBD, a photosensitizer in whose presence in sunlight NBD is isomerized to Q, a catalyst in whose presence Q is isomerized to regenerate NBD, and a separating device for the purpose of local concentration of at least one of these ingredients, in which system at least one of the photosensitizer and catalyst comprises a semi-permeable membrane on which the photosensitizer substance and/or the catalytic substance is chemically bound to said membrane.

19. The method of storing and retrieving solar energy in the form of heat which comprises exposing NBD to sunlight in the presence of a photosensitizer, isomerizing NBD to its isomer Q, removing Q from the sunlight with the assistance of a separating means, and exposing Q to a catalyst to release said absorbed solar energy in the form of heat while regenerating NBD from isomer Q, in which method at least one of the catalyst and sensitizer is held in chemical attachment to an insoluble silanized matrix.

20. A solar energy system comprising a photoisomer, a photosensitizer in whose presence in sunlight said photoisomer is isomerized to a higher energy isomer, said photosensitizer being held in chemical attachment to an insoluble matrix wherein the chemical attachment is selected from the group consisting of silanes and titanates.

21. The solar energy system of claim 20, wherein the chemical attachment is titanate.

22. The solar energy system of claim 20 wherein the chemical attachment is silane.

* * * * *